United States Patent

Jennings, Jr.

[11] Patent Number: 5,207,778
[45] Date of Patent: May 4, 1993

[54] METHOD OF MATRIX ACIDIZING

[75] Inventor: Alfred R. Jennings, Jr., Plano, Tex.

[73] Assignee: Mobil Oil Corporation, Fairfax, Va.

[21] Appl. No.: 782,192

[22] Filed: Oct. 24, 1991

[51] Int. Cl.⁵ .............................. E21B 43/27
[52] U.S. Cl. .................. 166/281; 166/307
[58] Field of Search .............. 166/281, 307, 271

[56] References Cited

U.S. PATENT DOCUMENTS

| | | | |
|---|---|---|---|
| 2,850,098 | 9/1958 | Moll et al. | 166/307 |
| 3,076,762 | 2/1963 | Dill | 166/307 |
| 3,233,672 | 2/1966 | Carpenter | 166/307 |
| 3,354,957 | 11/1967 | Every et al. | 166/302 |
| 4,007,789 | 2/1977 | Clampitt | 166/307 X |
| 4,237,974 | 12/1980 | Scherubel | 166/307 X |
| 4,787,456 | 11/1988 | Jennings, Jr. et al. | 166/281 |

Primary Examiner—Stephen J. Novosad
Attorney, Agent, or Firm—A. J. McKillop; G. W. Hager; C. A. Malone

[57] ABSTRACT

This invention is directed to a method to improve matrix acidizing of a carbonate containing formation by taking advantage of wormholes which are created during acidizing. The wormholes are closed with a solidifiable gel which protects them from entry of additional acid. The solidifiable gel is allowed sufficient time to form a solid. After a solid gel is formed, additional acid is directed into the formation where it moves past the wormholes containing the solid gel. Thereafter, an additional volume of solidifiable gel is directed into the formation where it protects any subsequently formed wormholes and diverts the acid further into the formation. An additional volume of acid is directed into the formation and the steps repeated until the formation has been acidized to obtain a desired degree of permeability.

4 Claims, 1 Drawing Sheet

METHOD OF MATRIX ACIDIZING

FIELD OF THE INVENTION

This invention is directed to the treatment of a subterranean carbonate formation where an acid is used in combination with a gel to improve the effectiveness of matrix acidizing.

BACKGROUND OF THE INVENTION

It is a common practice to acidize subterranean formations in order to increase the permeability thereof. For example, in the petroleum industry, it is conventional to inject an acidizing fluid into a well in order to increase the permeability of a surrounding hydrocarbon-bearing formation and thus facilitate the flow of hydrocarbonaceous fluids into the well from the formation or the injection of fluids such as gas or water, from the well into the formation. Such acidizing techniques may be carried out as "matrix acidizing" procedures or as "acid-fracturing" procedures.

In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures formed as well as by the chemical reaction of the acid within the formation.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In yet another technique involving acidizing, the formation is fractured. Thereafter, an acidizing fluid is injected into the formation at fracturing pressures to extend the created fracture. The acid functions to dissolve formation materials forming the walls of the fracture, thus increasing the width and permeability thereof.

In most cases, acidizing procedures are carried out in calcareous formations such as dolomites, limestones, dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent to the well. Thus, the acid becomes spent before it penetrates into the formation a significant distance from the well. For example, in matrix acidizing of a limestone formation, it is common to achieve maximum penetration with a live acid to a depth of only a few inches to a foot from the face of the wellbore. This, of course, severely limits the increase in productivity or injectivity of the well.

In order to increase the penetration depth, it has heretofore been proposed to add a reaction inhibitor to the acidizing fluid. For example, in U.S. Pat. No. 3,233,672 issued to N. F. Carpenter, there is disclosed an acidizing process in which inhibitor, such as alkyl-substituted carboximides and alkyl-substituted sulfoxides, is added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant, thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminants from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation to form hydrochloric acid which then attacks the formation.

From these teachings it is apparent that there are numerous limitations to present methods of matrix acidizing and diverting techniques. For example, when acid reacts in carbonates, "wormholes" are created. That is, acid reaction begins in a pore channel with little resistance. With continued exposure to acid, the wormhole takes more and more acid. In order to get the acid to a desired location, the wormhole is plugged. A diverting agent may damage the wormhole causing a decrease in the flow of hydrocarbonaceous fluids. Additionally, acid may be diverted to an undesired high permeability zone.

Therefore, what is needed is a method to improve matrix acidizing by taking advantage of wormhole generation while protecting existing wormholes from damage.

SUMMARY OF THE INVENTION

This invention is directed to a method for improved matrix acidizing in a carbonate containing formation. Initially, an acid sufficient to dissolve the carbonate containing formation is introduced into a high permeability zone where it forms "wormholes" which makes this zone more permeable. Next, a solidifiable viscous gel with gel breakers therein is directed into the higher permeability zone. This gel enters the wormholes and forms a solid therein which precludes entry of additional acid while displacing the acid further into the formation. Additional acid is introduced into the formation which acid bypasses the wormholes containing the solid gel and penetrates substantially further into the formation.

Thereafter, additional solidifiable viscous gel containing a gel breaker is introduced into the formation where it bypasses wormholes containing the solid gel and proceeds to displace the acid further into the formation. Subsequently, additional acid is directed into the formation which bypasses the wormholes containing the solid gel and proceeds substantially further into the formation. The steps of introducing additional solidifiable viscous gel with gel breakers therein and additional acid are repeated until the formation's permeability has been substantially increased.

It is therefore an object of this invention to cause acid to contact substantially greater areas in a formation than is presently possible.

It is another object of this invention to provide for a method of matrix acidizing by utilizing a solidifiable gel with gel breakers therein to form a solid gel in wormholes to preclude additional acid entry therein.

It is still another object of this invention to use a solid diverting agent which will liquefy so as to cause acid to be diverted further in the formation and subsequently cause the diverting agent to be removed once the gel breaks.

It is still yet another object of this invention to maintain and increase the permeability of a carbonate formation during matrix acidizing by the use of a liquefiable solid gel.

It is yet still another object of this invention to obtain a more efficient matrix acidizing of a formation while substantially reducing the volume of acid utilized.

DESCRIPTION OF THE PREFERRED EMBODIMENTS

Figure 1:
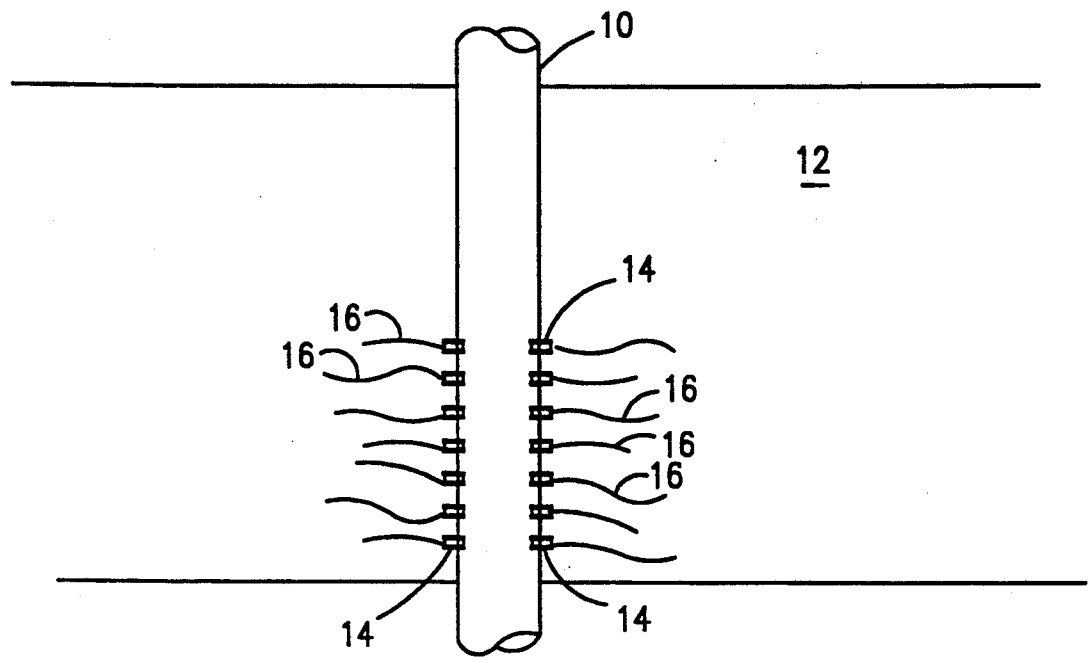
FIG. 1 is a schematic representation which shows wormholes initially being formed in a formation.

In the practice of this invention, referring to FIG. 1, a pore volume of an acid sufficient to etch a carbonate containing formation is introduced into wellbore 10 where it enters a higher permeability zone via perforations 14 in the wellbore. The acid is injected at a pressure less than the fracturing pressure of the wellbore. Upon entering the formation the acid attacks the carbonate formation and etches channels which radiate outwardly from the well. These channels are commonly referred to as wormholes. The use of hydrochloric acid composition in matrix acidizing is disclosed in U.S. Pat. No. 4,787,456 which issued to Jennings, Jr. et al. on Nov. 29, 1988. This patent is hereby incorporated by reference herein.

Figure 2:
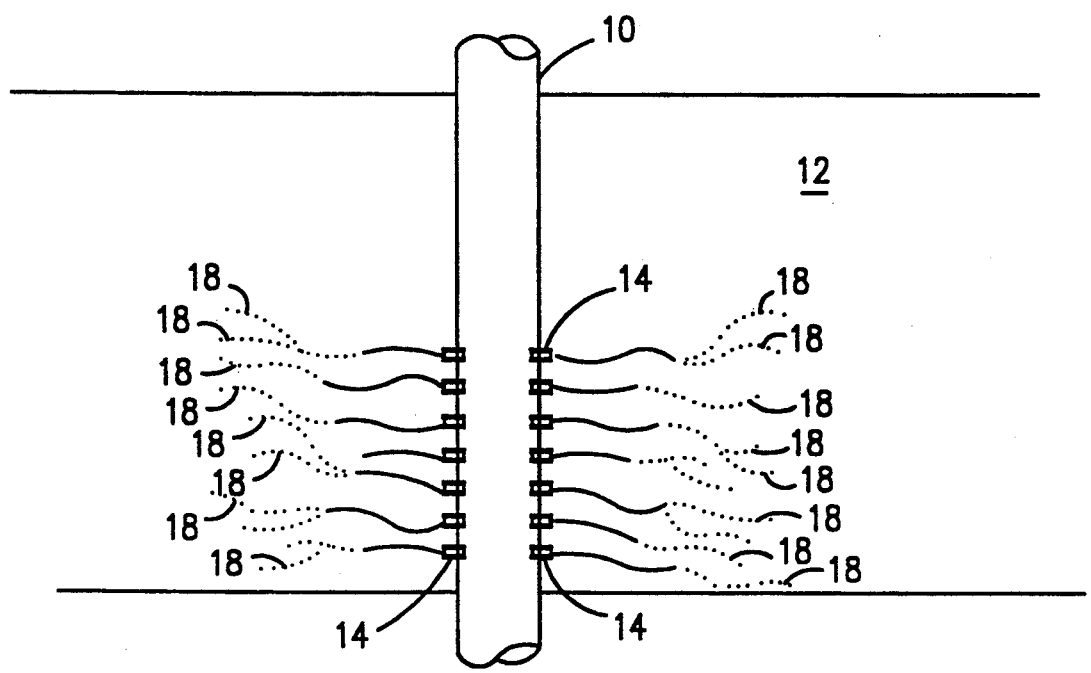
FIG. 2 is a schematic representation which depicts existing wormholes closed by a solidifiable gel which causes acid to be diverted into other areas of the formation.

In order to obtain a greater and more diversified penetration of the acid into the formation, a solidifiable viscous gel with gel breakers therein is directed into wellbore 10 where it enters formation 12 via perforations 14. When the viscous gel proceeds into the formation it enters the wormholes 16 and forms a solid gel therein. This solid gel precludes the entry of additional acid and also displaces the etching acid further into formation 12. The solidifiable viscous gel is allowed to remain in the formation for a time sufficient to form a solid gel. Once a solid gel has been formed, additional acid is directed into formation 12 where it bypasses wormholes 16 containing the solid gel and penetrates substantially further into the formation where additional wormholes are created and extended further into the formation. This extension of wormholes into formation 12 is represented in FIG. 2. The extended wormholes 18 penetrate further into the formation. Additional wormholes 16 are also created near wellbore 10.

In order to force the acid further into formation 12, additional solidifiable viscous gel with gel breakers therein is directed into the formation where it then pushes the acid even further into formation 12. As the acid proceeds into the formation, additional wormholes are created since the acid bypasses any wormholes in which the solidifiable gel has formed a solid. The steps of placing an acid into the formation and then directing a solidifiable viscous gel into the formation thereafter is continued for a time sufficient to create a desired degree of permeability into the carbonate containing formation. Once the desired degree of permeability has been obtained, acid is then placed into the formation which is followed by an "overflush" of ungelled fluid sufficient to displace the acid into the formation.

The preferred acid for utilization herein comprises hydrochloric acid. Although hydrochloric acid is preferred, certain organic acids can be utilized. These organic acids include formic, acetic and oxalic. When hydrochloric acid is utilized, it should be in a concentration of about 5 to about 28 volume percent. A concentration of 28 volume percent is preferred.

The solidifiable viscous gel which is preferred for use herein comprises a cross-linked hydroxypropyl guar (HPG) guar or a hydroxyethyl cellulose (HEC). The volume of viscous gel which is used should be at least twice the volume of the initial acid which is placed into the formation. By utilization of twice the volume of gel as that of acid in the initial stage, the gel fluid will accomplish three things.

First, it displaces a stage of reacting acid further into the formation. Second, it protects the wormholes which have been created by filling them with a cross-linked gel. Third, the gel acts as an effective diverter for the next stage of acid once it forms a solid. Each additional volume of viscous gel which follows the acid will fill any "secondary" or "tertiary" wormholes created in the high permeability zone of the formation. Although the amount of acid utilized will vary with the carbonate formation being treated approximately 100 gallons of hydrochloric acid should be used per foot of interval.

The concentration of HPG guar utilized herein or hydroxyethyl cellulose will be formation dependent and will also vary depending on the stability and the rigidity of the solidified gel which is desired to be formed in wormholes 16 and 18. The preferred amount of cross-linked hydroxypropyl guar (HPG) guar is in the amount of about 0.70 to about 10 weight percent of the mixture. A concentration of HPG or HEC which can be used herein is discussed in U.S. Pat. No. 4,787,456 which issued to Jennings, Jr. et al. on Nov. 29, 1988. This patent is hereby incorporated by reference herein.

The gel breakers which are incorporated into the solidifiable viscous gel can comprise enzymes or internal gel breakers. Gel breakers which can be utilized herein along with preferred concentrations are disclosed in U.S. Pat. No. 4,787,456 mentioned above. The gel breakers should be placed into the viscous gel in an amount so as to allow the complete operation to be performed prior to the gel breaking. Once the gel breaks, it flows from the formation into wellbore 10 where it is removed along with any produced hydrocarbonaceous fluids. Because the gel breaks and is removed from the formation, the formation's permeability is unaffected by the gel. Thus, the increased permeability obtained by matrix acidizing is maintained which makes for a more effective and efficient matrix acidizing operation.

Obviously, many other variations and modifications of this invention, as previously set forth, may be made without departing from the spirit and scope of this invention as those skilled in the art will readily understand. Such variations and modifications are considered part of this invention and within the purview and scope of the appended claims.

What is claimed is:

1. A method to improve matrix acidizing in a carbonate containing formation comprising:
   a) introducing a pore volume of hydrochloric acid into a formation which enters a zone of higher permeability thereby forming wormholes which make this zone more permeable;
   b) directing a solidifiable viscous gel with gel breakers into the higher permeability zone which gel enters the wormholes and forms a solid gel therein which precludes entry of additional acid while displacing the acid further into the formation;
   c) introducing additional acid into the formation which acid bypasses the wormholes in the higher permeability zone containing the solid gel and penetrates substantially further into the formation; and
   d) repeating steps b) and c) which displaces acid further into the formation so as to substantially increase the permeability of the formation and improve matrix acidizing.

2. The method as recited in claim 1 where the hydrochloric acid is of a concentration of about 5 to about 28 volume percent.

3. The method as recited in claim 1 where after step d) the solid gel is allowed sufficient time to break thereby opening the wormholes which allows additional hydrocarbonaceous fluids to be produced from the formation.

4. The method as recited in claim 1 where steps b) and c) are repeated until the formation has been acidized to obtain a desired permeability increase and thereafter ungelled fluid is directed into the formation.

* * * * *